3,323,991
SYNERGISTIC COCCIDIOSTATIC COMPOSITIONS AND METHODS
Samuel G. Kahn, Metuchen, N.J., and Phillip Paul Actor, Phoenixville, Pa., assignors, by mesne assignments, to E. R. Squibb & Sons, Inc., New York, N.Y., a corporation of Delaware
No Drawing. Filed May 19, 1965, Ser. No. 457,213
10 Claims. (Cl. 167—53.1)

This invention relates to new compositions of matter, and, more particularly, new compositions for the treatment of coccidiosis.

Prior to this invention, it was known that certain sulfa drugs, such as sulfaquinoxaline, acetyl-(p-nitrophenyl)sulfanilamide, dinitrodiphenylsulfonylethylenediamine, and N'-phenylsulfanilamide, are effective in the treatment of coccidiosis, especially *E. tenella* infections. For such purpose these drugs are customarily added to feed rations.

It has now been found that if a mixture of such sulfa drug and the antibiotic, nystatin, are used, the efficacy of the sulfa drug is increased. This synergistic effect of nystatin is surprising since the antibiotic in itself has no coccidiostat activity, and the addition of other antibiotics, such as bacitracin, chlortetracycline, penicillin and streptomycin, had no effect on the coccidiostat activity of the sulfa drug.

The new compositions of this invention, therefore, comprise a sulfa drug and nystatin. Although any sulfa drug having coccidiostat activity may be used, and such sulfa drugs as acetyl-(p-nitrophenyl)sulfanilamide, dinitrodiphenylsulfonylethylenediamine and N'-phenylsulfanilamide are effective, the preferred sulfa drug is sulfaquinoxaline. The sulfa drug may be used either as such or in the form of a derivative thereof, such as a salt, and it is understood that the terms "sulfa drug" and "sulfaquinoxaline" as used in this specification are intended to include not only the free compound but also such derivatives thereof. Similarly, the term "nystatin" encompasses not only nystatin per se, but also salts, complexes and other derivatives thereof, as well as partially purified nystatin containing fermentation broths.

The proportion of sulfa drug to nystatin is not critical, but to assure maximum synergistic activity, at least about 0.4 gram of nystatin is present per gram of sulfa drug; and optimally about 0.4 to about 5 grams of nystatin is present per gram of sulfa drug. The combination of this invention can be administered in any convenient manner. For ease of administration, however, the combination is preferably administered perorally, such as by mixing with a feed. When so administered, the sulfa drug is preferably present in a concentration of at least one part per 4000 parts by weight of feed, and optimally about 5 parts to about 100 parts per 10,000 parts by weight of feed.

The compositions of this invention can be used to treat any animal subect to coccidiosis infections, such as poultry (e.g., chickens and turkeys).

The following examples illustrate the invention:

*Example 1*

To prepare a mixture of nystatin and sulfaquinoxaline, 20 to 200 grams of nystatin and 45 to 910 grams of sulfaquinoxaline [as 100% N'-(2-quinoxalinyl)sulfanilamide] are intermixed by means of hand mixing in a mortar followed by mixing in a small Hobart mixer.

*Example 2*

To prepare a poultry feedstuff containing a mixture of nystatin and sulfaquinoxaline, the following components in the indicated percentages by weight are intermixed by means of feed mixers:

| | Percent |
|---|---|
| Nystatin | 0.02 |
| Sulfaquinoxaline [as 100% N' - (2 - quinoxalinyl)-sulfanilamide] | 0.025 |
| Soybean Oil Meal (50% protein) | 35.00 |
| Yellow corn (ground) | 47.00 |
| Fish solubles (50% solids) | 2.50 |
| Animal fat | 6.00 |
| Alfalfa | 2.00 |
| Dicalcium phosphate | 1.75 |
| Calcium carbonate | 1.60 |
| Sodium chloride | 0.50 |
| dl-Methionine | 0.05 |
| Vitamin mix | 1.00 |
| Trace mineral mix | 0.10 |

*Example 3*

To prepare a feed additive containing a mixture of nystatin and sulfaquinoxaline, the following components are intermixed by means of a feed mixer:

| | Grams |
|---|---|
| Nystatin | 200 |
| Sulfaquinoxaline [as 100% N'-(2-quinoxalinyl)-sulfanilamide] | 227 |
| Ground oyster shell flour plus diatomaceous earth | 4,340 |
| Wheat glutens and soybean meal feed additive premix | 568 | giving a total of 5,335 g. of feed additive premix to be mixed with a ton of poultry feed.

The following table shows the effect of nystatin and sulfaquinoxaline in 3 to 4 week old White Leghorn chicks, infected by injection with 20,000 sporulated oocysts of a pathogenic strain of *Eimeria tenella* one day after being fed with the indicated test diet. All deaths observed occurred between 120 and 168 hours after infection. The basal diet used is that described in Example 2, without the nystatin and sulfaquinoxaline.

| Treatment | No. of birds treated | Percent mortality |
|---|---|---|
| Basal diet | 20 | 60 |
| Basal diet plus sulfaquinoxaline (250 mg./kg. of diet) | 20 | 30 |
| Basal diet plus sulfaquinoxaline (250 mg./kg. of diet) and nystatin (220 mg./kg. of diet) | 20 | 10 |
| Basal diet plus nystatin (220 mg./kg. of diet) | 60 | 65 |

As can be seen from the table, whereas the basal diet, either alone or in combination with nystatin, afforded at most 40% protection, and the basal diet plus sulfaquinoxaline afforded only 70% protection, the basal diet plus the combination of sulfaquinoxaline and nystatin afforded 90% protection.

This invention may be otherwise variously embodied within the scope of the appended claims.

What is claimed is:
1. A coccidiostat combination comprising a sulfa drug and nystatin, said combination of coccidiostats being proportioned as to be synergistic in the treatment of coccidiosis.
2. A coccidiostat combination of sulfaquinoxaline and nystatin proportioned as to be synergistic in the treatment of coccidiosis.
3. The combination of claim 2, wherein at least about 0.4 gram of nystatin is present per gram of sulfaquinoxaline.
4. A feed additive comprising a coccidiostat combination in accordance with claim 1 in a feedstuff.

5. A feed additive comprising a combination of sulfaquinoxaline and nystatin proportioned as to be synergistic in the treatment of coccidiosis in a feedstuff.

6. A feed additive comprising a combination of sulfaquinoxaline and nystatin in a feedstuff, at least 0.4 gram of nystatin proportioned as to be synergistic in the treatment of coccidiosis being present per gram of sulfaquinoxaline.

7. A method of treating coccidiosis which comprises feeding a coccidiostat combination in accordance with claim 1 to poultry.

8. A method for treating coccidiosis, which comprises feeding a mixture of a coccidiostatically synergistically effective amount of sulfaquinoxaline and nystatin to poultry.

9. The method of claim 8, wherein the sulfaquinoxaline is present in a concentration of at least one part per 4000 parts by weight of the feed.

10. The method of claim 9, wherein at least about 0.4 gram of nystatin is present per gram of sulfaquinoxaline.

References Cited

Gardiner: Veterinary Bulletin, vol. 30, page 440 (1960).

Gordon: Chem. Abstracts, 50 (1956), page $2843^d$.

ALBERT T. MEYERS, *Primary Examiner.*

JULIAN S. LEVITT, SAM ROSEN, *Examiners.*

STANLEY J. FRIEDMAN, *Assistant Examiner.*